March 19, 1935. H. WILLIAMS ET AL 1,995,135
BRAKE AND BRAKE OPERATING MECHANISM
Filed March 27, 1931 2 Sheets-Sheet 1
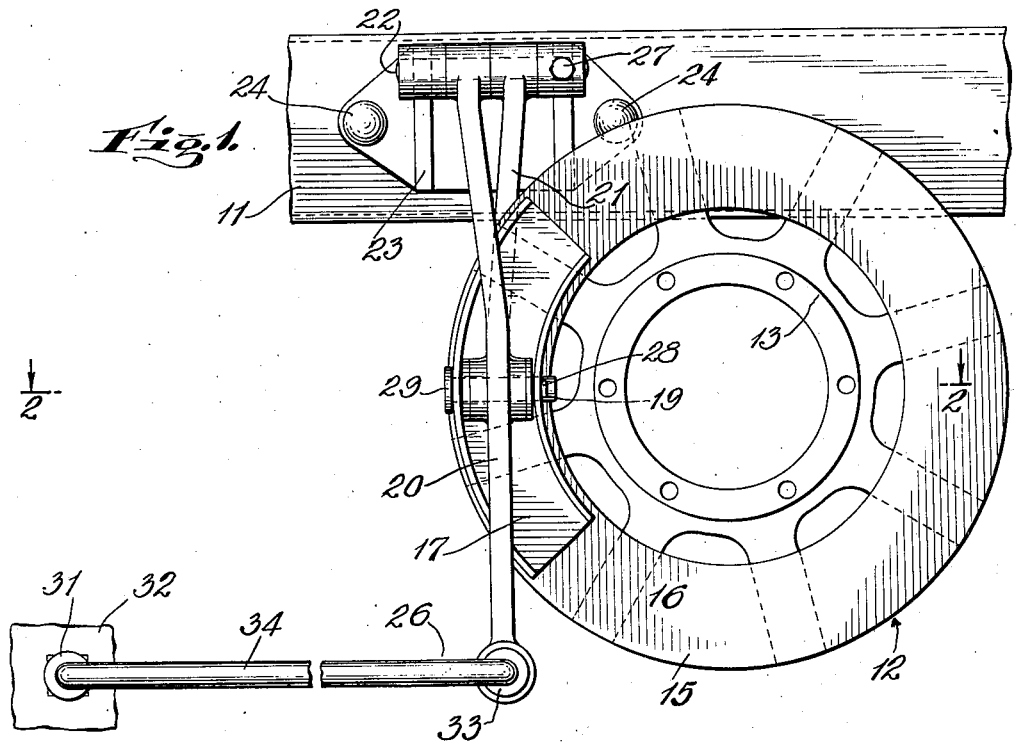
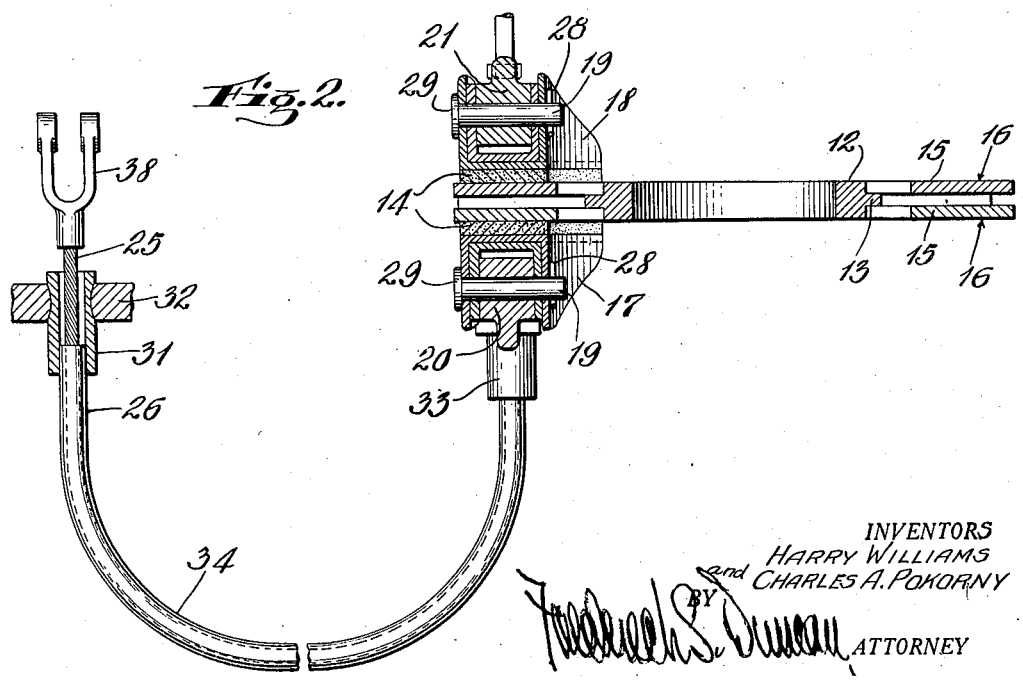
INVENTORS
HARRY WILLIAMS
and CHARLES A. POKORNY
BY
ATTORNEY

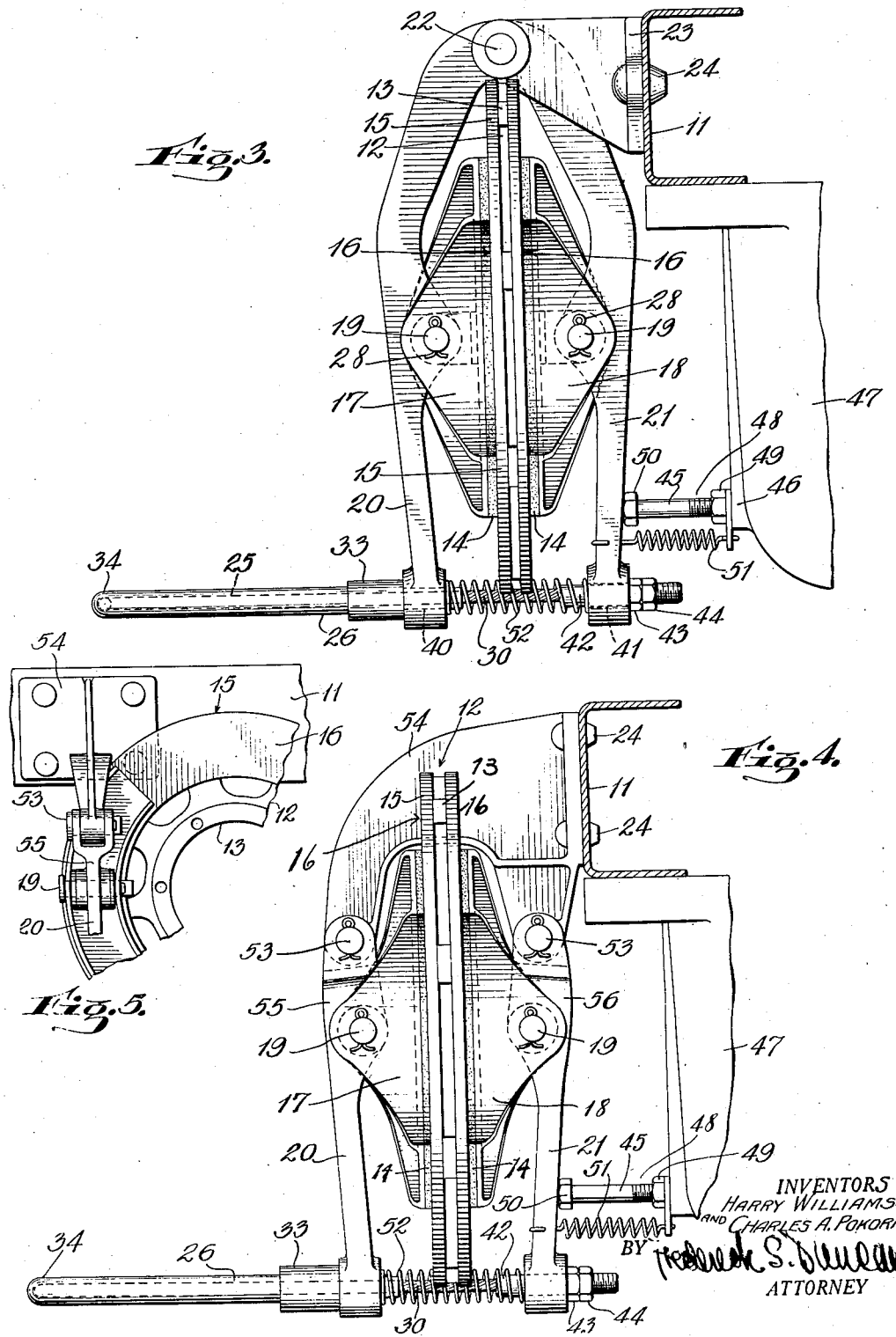

Patented Mar. 19, 1935

1,995,135

UNITED STATES PATENT OFFICE 1,995,135

BRAKE AND BRAKE OPERATING MECHANISM

Harry Williams, Birmingham, and Charles A. Pokorny, Detroit, Mich., assignors to American Cable Company, Inc., a corporation of Delaware Application March 27, 1931, Serial No. 525,672

5 Claims. (Cl. 188—72)

This invention relates to brakes and has for an object the provision of mechanism for operating a well-known type of brake assembly in which a rotor having a disk provided with lateral braking surfaces is supported rotatably upon a suitable structure, in combination with a pair of brake shoes positioned one on each side of the disk and mounted on hangers or levers adapted to swing oppositely to each other and transversely to the plane of the disk for the purpose of applying said brake shoes to the disk and releasing them therefrom.

A particular object of the invention is to provide improved operating mechanism for effecting equalized braking movements of the brake shoes against such a disk, said mechanism comprising a flexible shaft member and a flexible casing therefor, said members being capable of relative longitudinal movement with respect to each other, and connected respectively with said brake-shoes, with said supporting means, and with suitable power-applying means, in such a manner that, when the power-applying means are operated, the shaft member or the shaft casing member, as the case may be, is moved relatively to the other member, acting to draw or thrust one brake-shoe against one side of the rotor disk, while the other member, either the casing or the shaft, as the case may be, exerts a thrust or draft upon the other brake shoe, acting to force it against the opposite side of the rotor disk.

Provision for equalizing these opposed braking movements of the shoes is preferably made by mounting fixedly on the supporting structure an end of one of the above mentioned members, preferably one end of the shaft casing, and by supporting the intermediate associated portions of the flexible shaft and casing members in normally curved position, so that when draft or thrust is exerted upon the member which is connected with the power-applying means, there will be either a compressive action upon the shaft-casing, if a draft be exerted by the power-applying means, or an expanding action if a thrust be exerted by the power-applying means.

In either case, as the flexible shaft and casing members are only free to move at their ends which are connected with the brake shoes, and as the brake shoes are free to swing relatively to the rotor disk, after one of the brake shoes has been drawn against the rotor disk or thrust against it, as the case may be, the compressive action or expansive action upon the associated flexed members will be translated into a thrust or draft upon the brake shoe which has not yet been engaged with the rotor disk, and when it also has been engaged, the brake shoes will be thereafter applied with equal opposed pressures against the rotor disk.

A further object of the invention is to provide means, preferably spring-actuated, to cause automatic separation of the brake-shoes from each other, with resultant disengagement from the rotor disk, when the power-applying means is retracted.

Another object is to provide readily operated means for limiting the range of retractive movement of the shoes relatively to each other, so that they will be maintained in desirably close proximity to the rotor disk, and need therefore be only moved for a short distance to apply them fully.

Still another object is to provide readily operated means to adjust at least one of the shoes relatively to the other for the purpose of taking up wear.

The above, and other, features of the invention are illustrated and described fully in the accompanying drawings and specification, and are pointed out in the claims.

In the drawings,

Fig. 1 is a view in side elevation of a brake assembly in the construction of which the invention has been embodied.

Fig. 2 is a view of the same in horizontal section on the line 2—2 of Fig. 1.

Fig. 3 is a view of the same in side elevation.

Fig. 4 is a view similar to Fig. 3 of a modification.

Fig. 5 is an fragmentary, detail view in front elevation, on a reduced scale, of part of the modification shown in Fig. 4.

In a now-preferred embodiment of the invention selected for illustration and description, the part designated by the reference character 11 is part of the chassis of an automobile, as for example a transverse member of the chassis frame, constituting a suitable supporting structure for the brake assembly.

The reference character 12 designates generally a rotor, which may be of any suitable form, and may be mounted to rotate with any suitable rotating member of the automobile, and has been particularly designed in the instance illustrated to be mounted upon the transmission shaft (not shown) by means of the conventional flange of a suitable spider 13.

The rotor 12 has a disk or disks 15, each face 16 of which constitutes a braking surface of annular form, adapted to be engaged respectively by segmental brake shoes 17 and 18, mounted pivotally upon pins 19 supported in hangers 20 and 21 which swing from a pivot or shaft 22 mounted in a bracket 23 secured to the supporting structure 11 at 24. These hangers and their respective connected brake shoes are movable freely in a direction transverse to the plane of the disk 15, independently of each other, except so far as they are controlled by the linkage or operating mechanism hereinafter described.

In pursuance of the invention, means of an improved character are provided to apply the brake shoes 17 and 18 to the brake faces 16 of the rotor disk with equal pressure, the said means comprising a flexible shaft member 25 and a flexible metal shaft-casing member 26, said members being capable of relative longitudinal movement with respect to each other, and being of any suitable construction, preferably being respectively substantially non-compressible and non-extensible.

The casing member 26 is preferably provided at each end with a suitable fitting to permit attachment of the ends of the shaft casing to the cooperating elements of the brake assembly. In the instance illustrated, the fitting 31 is secured to a suitable stationary part 32 of the chassis, and the fitting 33 at the other end of the casing is adapted to abut against the hanger 20.

This end of the shaft-casing is free to float or move with the hanger 20 in a direction transverse to the plane of the rotor disk 15, and the intermediate portion 34 of the associated shaft casing and shaft is preferably curved or flexed, approximately as illustrated, for a purpose to be described.

The flexible shaft member 25, in the instance illustrated, comprises a flexible wire cable, of a size suitable to fit snugly, and move easily, within its casing, the form of brake illustrated being intended for operation by exerting a draft upon the shaft member 25 by means of any suitable power-applying means, such as the conventional emergency or hand brake lever of an automobile, not shown, connected with the yoke fitting 38 provided on the end of the cable which projects from the fitting 31 of the casing 26.

The other end 30 of the cable 25 (see Fig. 3) extends through suitable apertures 40 and 41 in the lower ends of the hangers 20 and 21, being free to float therewith, and is provided with a fitting 42 having a threaded portion on which is screwed an adjusting nut 43 and a check nut 44. By suitable adjustment of these nuts, the normal distance between the brake shoes 17 and 18 may be regulated, either at the time of installation, or to take up wear.

An adjustable abutment 45 is preferably provided, comprising a post mounted at 46 on a part 47 of the supporting structure, and having a threaded end 48 on which is screwed a nut or nuts 49, the head 50 of the post extending in position to be engaged by the hanger 21, the latter being urged outwardly, normally by a spring 51. The hanger 21, with its brake shoe 18, can only swing outwardly to the extent permitted by the head 50, which is preferably adjusted to hold the brake shoe 18 as near as possible to the disk 15, without actual contact, when the brakes are not applied.

A coil spring 52 surrounds the part 30 of the cable between the free ends of the hangers, and tends to force the hangers and brake shoes apart when the latter are not being applied.

The brake shoes 17 and 18 are preferably provided with renewable friction linings 14 which may be of any conventional or suitable form and material, and for the purpose of replacing these from time to time the brake shoes may be removed after withdrawing the pivot pins 19, which are shown as having a head 29 at one end and a cotter-pin 28 at the other end. The pivot shaft 22 is also readily removable, being held in position by suitable means, such as the set-screw 27.

The above described mechanism operates in the following manner:

When a draft is exerted upon the flexible cable or shaft 25, by power applied to the yoke 38, the cable is caused to move lengthwise in the flexible casing 26, and the other end 30 acts through the fitting 42 and nuts 43 and 44 to draw the hanger 21 and brake-shoe 18 toward the disk 15, thus initiating the application of the brake.

Thereupon, further draft upon the cable 25 is communicated to the curved portion 34 of the shaft casing, and as the casing is fixed at 31 to the stationary part 32 of the supporting structure, while the fitting 33 at the free end of the shaft casing abuts against the hanger 20, there is a tendency of the associated curved portions of the shaft and casing at 34 to increase their radius under the compressive action thereon of the shaft when so drawn, and this action is translated into a thrust upon the hanger 20, which is communicated to the brake shoe 17, and accordingly the brake shoes 17 and 18 are applied to opposite sides of the disk 15 with equal pressures, thus carrying the invention into effect.

When the draft upon cable 25 is relaxed, the spring 52 urges the hangers 20 and 21 apart, and releases the brake-shoes from braking contact with the surfaces 16 of the disk 15, this separating movement continuing until the hanger 21 contacts with the head 50 of the abutment post 45.

The proportions and arrangement of the different members may be varied in accordance with the requirements of particular installations.

In the instance illustrated in Figs. 1 to 3 the length of the hangers, and the relative position of their pivots 22 and 19 is such as to give a reduction in the power applied of about 2 to 1, and accordingly the hangers 20 and 21 may be long enough to permit the use of a single pivot 22 on the supporting structure.

In the modification illustrated in Figs. 4 and 5, the pivots 19 are so disposed relatively to the pivots 53 as to yield a ratio of 4 to 1, and inasmuch as the pivotal point 53 of each hanger must be much nearer the brake shoe pivot 19, it is necessary to provide two pivots 53, one opposite each face of the disk 15, a modified form of supporting bracket 54 being provided to support the pivots, and the arms 55 and 56 of the hangers being suitably shorter than the arm 6 shown in Figs. 1 to 3.

The other parts may be formed as already described, and bear the same reference characters, operating in the same manner.

Having thus described the illustrated embodiments of our invention and having in mind that variations and modifications of the same may be made, we define the scope of the invention by the following claims.

We claim:

1. A brake and operating mechanism therefor, comprising a rotatably mounted disk, a pair of hangers mounted on said structure to swing respectively transverse to the plane of said disk, a pair of brake shoes, one carried by each of said hangers at each side of said disk, and operating means for applying said brake shoes to said disk, said operating means comprising a flexible shaft member and a flexible casing member therefor, said members being capable of longitudinal movement relatively to each other, each of said members being connected at one of its ends to one of said hangers, and said members being connected at their other ends respectively, one to a fixed mounting and one to power-applying means, whereby said members may be moved longitudinally relatively to each other to cause equalized application of said brake shoes to said disk, a spring carried between said hangers and tending normally to urge them apart, said hangers, brake shoes and spring being movable as a unitary structure transversely to the plane of said disk, a secondary spring tending to move said unitary structure in one direction transversely to said disk, and an adjustable abutment to limit said unitary movement.

2. The combination with a supporting structure, and a rotor mounted rotatably upon said structure, said rotor having a disk portion, of a pair of hangers having each an end pivoted on said structure, a pair of brake shoes, one mounted on each of said hangers at each side of said disk and adapted to swing thereon in opposite directions respectively transverse to the plane of said disk, of operating means for applying said brake shoes to said disk, said operating means comprising a flexible shaft member and a flexible casing member therefor, said members being capable of longitudinal movement relatively to each other, each of said members being connected at one of its ends to one of said hangers or brake shoes, and said members being connected at their other ends respectively, one to said supporting structure and one to power-applying means, whereby said members may be moved longitudinally relatively to each other to cause equalized application of said brake shoes to said disk.

3. A brake and operating mechanism therefor, comprising a support, a rotatably mounted disk, a pair of levers mounted pivotally on said support and extending along opposite faces of said disk and adapted to swing independently of each other transversely to the plane of said disk, a pair of brake shoes, one at each side of said disk, each of said brake shoes being connected with one of said levers at a region intermediate the ends of the lever, operating means connecting the free ends of said levers and free to float therewith, said floating operating means comprising the free end portions of a flexible shaft and flexible casing for said shaft, the free end-portion of said shaft being connected with one of said levers and the free end portion of said casing being connected with the other lever.

4. A brake and operating mechanism therefor, comprising a rotatably mounted disk, a pair of brake shoes positioned one on each side of the disk and mounted to swing independently of each other transversely to the plane thereof, and operating mechanism for applying said shoes to the disk, comprising a flexible shaft casing member, one end of which is connected with one of said shoes, and a flexible shaft member in said shaft casing, one end of which is connected with the other of said shoes, and means connected with the other ends of said shaft and casing, respectively, including power-applying means connected with one of said members to cause relative longitudinal movement of said members with respect to each other to apply said shoes to said disk with equalized pressures, said brake and operating mechanism being further characterized by a support and a pair of hangers mounted pivotally on said support and each having a pivot on which one of the said shoes is mounted, the free ends of said hangers serving respectively as means to connect one of said operating members to one of said brake shoes.

5. A brake and operating mechanism therefor, comprising a rotatably mounted disk, a pair of brake shoes positioned one on each side of the disk and mounted to swing independently of each other transversely to the plane thereof, and operating mechanism for applying said shoes to the disk, comprising a flexible shaft casing member, one end of which is connected with one of said shoes, and a flexible shaft member in said shaft casing, one end of which is connected with the other of said shoes, and means connected with the other ends of said shaft and casing, respectively, including power-applying means connected with one of said members to cause relative longitudinal movement of said members with respect to each other to apply said shoes to said disk with equalized pressures, said brake and operating mechanism being further characterized by having a portion of said flexible shaft member and flexible conduit member curved intermediate their ends, said curved portion tending to increase its radius under the action of a draft exerted by said power-applying means.

HARRY WILLIAMS.
CHARLES A. POKORNY.